Dec. 3, 1929.
A. R. ROWE
1,738,209
HOT TOP HOLDING CLIP
Filed Sept. 6, 1928
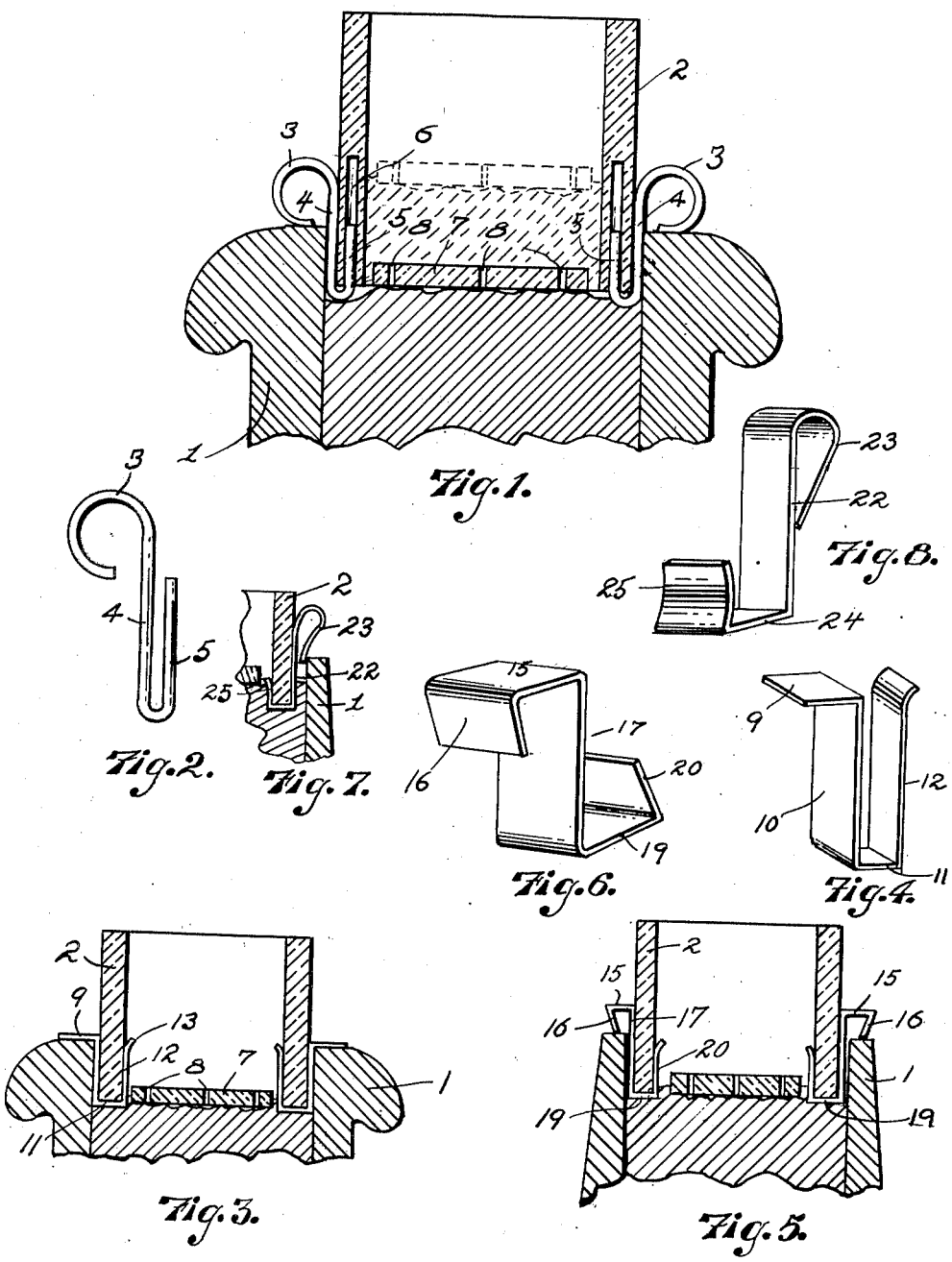
A. R. Rowe
INVENTOR Patented Dec. 3, 1929

1,738,209

UNITED STATES PATENT OFFICE

ANDREW R. ROWE, OF MIDLAND, PENNSYLVANIA

HOT-TOP-HOLDING CLIP

Application filed September 6, 1928. Serial No. 304,295.

This invention relates to improvements in hot tops for ingot molds and has for an object the facilitating of the adjustment of the hot top on the mold and to improve the means for holding the hot top in proper position on the mold.

Another object of the invention is to provide means for so manipulating the hot top that the original piping in the ingot may be materially lessened.

With these and other objects in view which will be apparent as the description proceeds, I will now describe my invention in connection with the accompanying drawings in which:

Fig. 1 is a cross sectional view of a mold and hot top with one form of my invention for locating the mold on the hot top.

Fig. 2 is a view of a clip used in holding the hot top on the mold;

Fig. 3 is a sectional view of a hot top and mold showing a modification of the supporting means;

Fig. 4 is a view of the hot top support used in the mold of Figure 3;

Fig. 5 is a sectional view of a second modification of my improved supporting means for the hot top of the mold;

Fig. 6 is a view showing the support of Figure 5;

Fig. 7 is a cross sectional view of a side of the mold and hot top with a third modified form of holding means; and Fig. 8 shows the holding means of Figure 7 detached.

1, Figure 1, is the ordinary ingot mold into which the molten iron is poured from a ladle. After the metal has reached a certain height in the mold 1, or indeed at any convenient time in the operation of the process of pouring the metal into the mold, my invention is designed to facilitate the proper location of the hot top in the mold and frictionally hold it in its adjusted position. It is desirable that a space be left between the outer surface of the hot top and the inner surface of the mold for the escape of air or gases and that the hot top be easily adjusted to its proper position in the mold since the heat of the molten iron renders it unpleasant to be working for any considerable length of time in adjusting the hot top in its proper position. The hot top 2 is ordinarily made of refractory material and I provide a clip 3 and so shape it that it may be easily attached to the hot top before the hot top is placed in its position in the mold. In the modification shown in Figure 1, the clip 3 comprises a rounded upper end and a depending portion 4. The portion 4 extends down below the bottom of the hot top and is bent up as shown at 5 and inserted in a hole 6 extending from the bottom of the hot top. The clip 3 should be more or less elastic and the part 5 should clamp the portion of the hot top included between the parts 4 and 5 with sufficient force to hold the clip firmly to the hot top. The clip 3 is frictionally attached to the hot top before the latter is inserted in its place in the top of the mold and the clip will hold the hot top in the position as shown in Figure 1.

I preferably provide a bottom 7 to the hot top also made of refractory material which may be placed on top of the metal either before or after the hot top has been placed in the position shown in Figure 1. After the parts have been arranged as shown in Figure 1, more metal is poured into the hot top and since the hot top is lighter than the metal, and the outer surface of the hot top is out of contact with the interior of the mold and bottom 7 of the hot top is loosely set in the hot top, the metal will flow through the small openings 8 and between the bottom and the interior of the hot top and the bottom of the hot top will be raised as more metal is poured into the hot top. The metal also will rise between the exterior surface of the hot top and the interior surface of the mold and raise the loose bottom in the hot top to the dotted line position shown in Figure 1.

The lower goose neck portion of the clip 3 will hold the hot top 2 in the position shown in Figure 1 as the metal rises in the hot top and after the metal freezes, the hot top can be removed in the usual way.

I have found that a hot top manipulated as indicated above will materially lessen the piping in the ingot and since the clips may be attached to the hot top before they are placed in position and the hot top carrying the clip easily be fit into the top of the mold in previously fixed position, the time of the attendant in fitting the top in the mold is reduced to a minimum. The hot top will be held in position by the clip while the bottom of the hot top will be allowed to rise easily and the usual piping ordinarily formed in the ingot is materially reduced.

Instead of the wire clip 3 shown in Figures 1 and 2 for holding the hot top in the mold, I may make the clip 9 of flat material as shown in Figures 3 and 4. This clip has a downwardly extending portion 10, a horizontal portion 11, and an upwardly extending portion 12 flared at its top as shown at 13. The portion 12 is slightly bent inwardly so as to clamp the hot top 2 and be firmly held thereto. The bottom 7 is sufficiently small to pass down inside the clips after they are clamped to the hot top and rest on the metal in the mold and when more metal is poured into the hot top, it will be broken up by the bottom 7 and run over the sides thereof and through the holes 8 and raise the bottom 7, and since the exterior surface of the hot top is but a short distance from the interior surface of the mold, the metal can surround the bottom of the hot top and the small amount between the outer surface of the hot top and the inner surface of the mold will be quickly frozen while the metal in the interior of the hot top will be kept in molten condition and the piping ordinarily formed in the top of the metal mold will be materially decreased and in some cases entirely obliterated.

In Figures 5 and 6 I have shown a second modification of the clip with an outturned upper portion 15 and a downwardly inclined end 16 adapted to rest on the top of the mold as shown in Figure 5 and thus form a spring holder. The vertical portion 17 of this clip extends down between the hot top 2 and the inner surface of the mold to separate the hot top from the mold, and the clip then has a horizontal portion 19 and a vertical portion 20 to clamp the bottom of the hot top and be held therein while it is being adjusted in position.

In Figures 7 and 8 I show a third modification of the clip comprising a vertical portion 22 and a turned over end 23, a horizontal portion 24 to pass under the bottom of the hot top 2 and clamp the same by a vertical portion 25.

I find it advantageous to arrange the clips so that there may be a slight vertical movement of the hot top during the freezing process. The upper portion of the clips shown in Figures 1, 2, 5, 6, 7 and 8 allows a slight vertical springy motion of the hot top. It is apparent from the shape of these clips that any slight contraction of the metal as it begins to freeze may pull down the hot top by reason of the springy portion of the upper ends of the clips and since all the clips may be attached to the hot top before its insertion in the mold, the attendant is relieved of any adjustment of the clips as the hot top is inserted in the mold and since the bottom of the hot top is entirely loose therein, it may be placed in the mold before the hot top is placed in position or afterwards as is found most convenient.

The loose bottom 7 of the hot top may be placed in the mold at any period of pouring. Since it is lighter than the metal, it will be kept on the top of the metal and will break up the metal as it is being poured into the mold. My preferred way of using my hot top is to pour the metal up to about the position in the mold as shown in Figures 1, 3 or 5, then put on the hot top and loose bottom and allow the metal to cool slightly and afterwards fill up the hot top to the position shown, for example, in Figure 1. On the first partial freezing of the metal to the hot top or during the permanent freezing of the metal, it is liable to contract or expand and cause the hot top to move downwardly or upwardly and unless there is some spring to the clips, the hot top will be broken up but with my improved clips this will not happen. The cooling process takes place naturally and since the hot tops can rise and fall slightly, that of itself seems to prevent the formation of piping or blisters in the metal and the use of my invention has materially decreased the percentage of piping in the top of the metal ingot.

What I claim as my invention:

1. A clip for frictionally holding a hot top in the end of a mold said clip comprising means extending down the side of the hot top and another portion to frictionally hold it to the hot top the clip having an offset to rest upon the top of the mold and support the hot top in the mold.

2. A clip for attaching a hot top to a mold comprising a vertical portion depending down the side of the hot top, a portion to clamp it to the hot top and an upper offset springy portion to rest on top of the mold and elastically support the hot top in the mold.

3. A clip for supporting a hot top in a mold comprising a wire having a vertical portion extending downwardly along the outer edge of the hot top thence under a portion of the hot top said hot top having a hole therein and the clip having an upwardly extending portion frictionally held in said hole said clip having an offset portion to rest on top of the hot top.

4. A clip for attaching a hot top to a mold, said clip having means to frictionally attach it to the hot top with sufficient force to hold the two together when moving about and to hold the clip to the hot top to prevent the hot top from rising by a slight buoyancy of the metal when flowing around the bottom portion of the hot top, said clip having an offset portion to rest on the top of the mold.

In testimony whereof I hereunto affix my signature.

ANDREW R. ROWE.